(12) United States Patent
Richez

(10) Patent No.: US 6,219,533 B1
(45) Date of Patent: Apr. 17, 2001

(54) PORTABLE TELEPHONE SUPPORT WITH A TILTING MEMBER

(75) Inventor: Bertrand Richez, Le Mans (FR)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/119,288

(22) Filed: Jul. 20, 1998

(30) Foreign Application Priority Data

Aug. 7, 1997 (FR) .................................................. 97 10128

(51) Int. Cl.⁷ ....................................................... H04B 1/38
(52) U.S. Cl. ........................... 455/90; 455/575; 455/351; 379/454; 379/455
(58) Field of Search .............................. 455/575, 90, 351, 455/347, 348, 349; 379/454, 455; 224/197, 195, 268, 270, 271; 524/451; 24/511; 16/330

(56) References Cited

U.S. PATENT DOCUMENTS

| | | | |
|---|---|---|---|
| 4,536,925 | * 8/1985 | Boothe et al. | ............... 24/511 |
| 5,125,131 | * 6/1992 | Leblanc | ................. 16/330 |
| 5,507,013 | 4/1996 | Weadon et al. | ........... 455/90 |
| 5,590,860 | 1/1997 | Fan | ........................ 248/126 |
| 5,590,986 | 1/1997 | Fan | ........................ 248/126 |
| 5,661,798 | * 8/1997 | Chen | ..................... 379/454 |
| 5,723,526 | * 3/1998 | Nagasawa | ............ 524/451 |
| 5,799,847 | * 9/1998 | Sandor | ................. 224/197 |

FOREIGN PATENT DOCUMENTS

| | | | |
|---|---|---|---|
| 3106459A1 | 10/1982 | (DE) | ............... H04R/1/02 |
| 8903173 | 6/1989 | (DE) | ............... H04B/1/00 |
| 06022016A | 1/1994 | (JP) | ............... H04M/1/12 |

\* cited by examiner

*Primary Examiner*—Fan Tsang
*Assistant Examiner*—Philip J. Sobutka
(74) *Attorney, Agent, or Firm*—Dicran Halajian

(57) ABSTRACT

A support mechanism is disclosed notably for a portable telephone, which is formed by transport means and positioning means for transporting the receiver clipped onto a piece of garment or a belt and for putting the receiver in an upright position on a piece of furniture. According to the invention, the transport and positioning means include a clip intended to be affixed by a first fixed end at the top of the back face of the receiver and including a tilting member which pivots around a shaft arranged at the second elastically movable end of the clip.

14 Claims, 3 Drawing Sheets

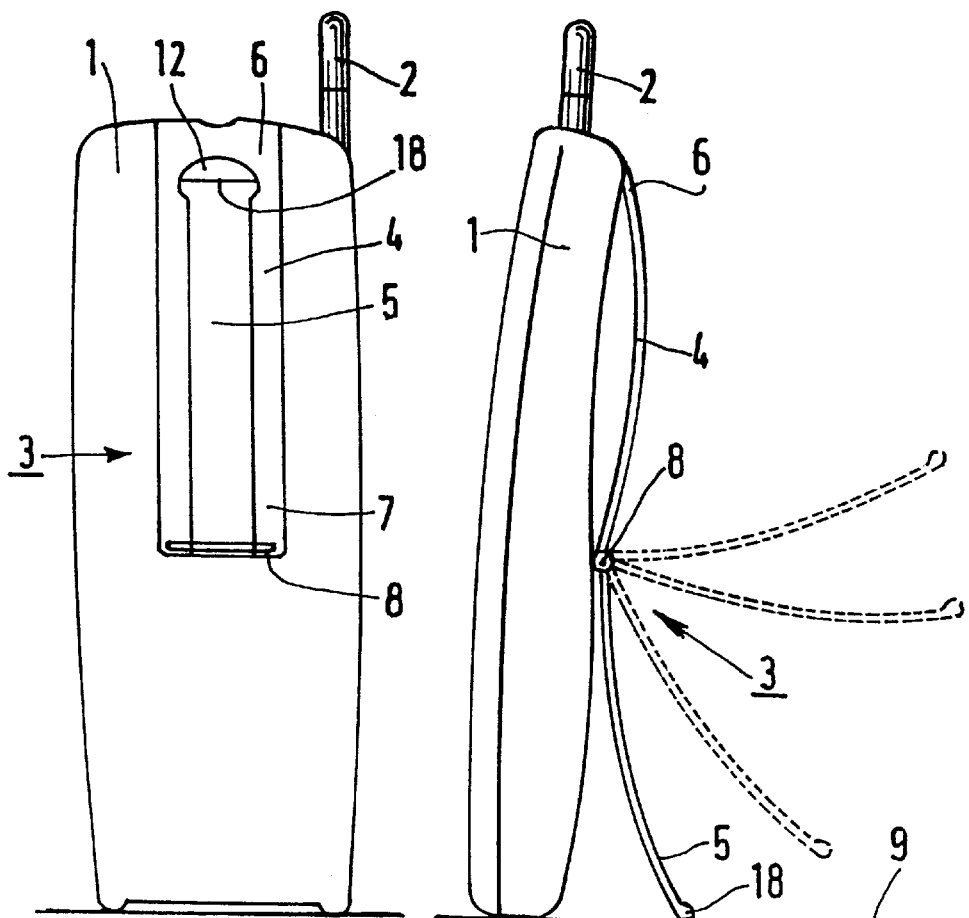
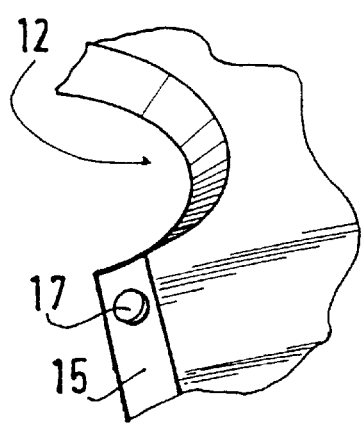
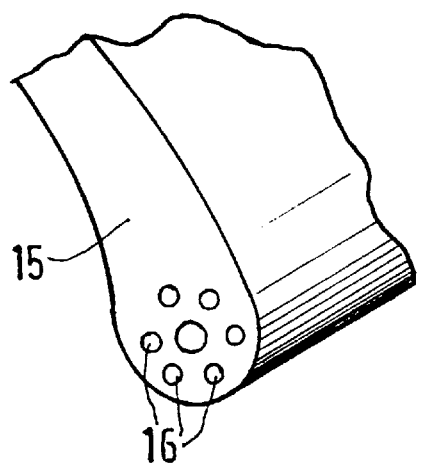

PORTABLE TELEPHONE SUPPORT WITH A TILTING MEMBER

FIELD OF THE INVENTION

The present invention relates to a support mechanism for a portable radio communication receiver, notably a portable telephone, formed by transport and positioning means for transporting said receiver clipped onto a piece of garment or a belt and for putting the receiver in upright position on a piece of furniture.

The invention likewise relates to a radio communication receiver including a support mechanism.

The invention is applied, inter alia, to cellular telephones.

So far, cellular telephones and other cordless telephones also called mobiles or portable telephones and called device or receiver in the following text have come to a sufficiently small size to be transported by a user, clipped onto a belt or even a piece of garment, or in a pocket. For such a way of transport, however, one has to take care that the device does not come loose too easily. For this purpose, there is generally provided a retaining clip mostly arranged on the back of the device, while this clip is intended to fasten the device to the belt or to the pocket containing it.

Another support function of the device consists of putting it on a table in an ergonomic manner, that is to say, in a more or less inclined position rather than horizontal position. In this manner, the display of the device can be read better and it is easier to fetch when one wishes to handle it.

Moreover, such a position is advantageous for good transmitting/receiving conditions of the antenna.

The invention is put in a context where one wishes to provide the two cited support functions, against a user and on a table.

BACKGROUND OF THE INVENTION

In the known devices which comprise a mechanism with the two support functions, these two functions are most often differentiated, the mechanism comprising two elements which are clearly separated and the two of them slewed substantially at the same location situated on the upper back part of the device. With regard hereto may be cited U.S. Pat. No. 5,590,860 whose relatively complex mechanism comprises four elements among which the two clearly separated elements cited above referenced 20 and 30 and which substantially have the same length. The element 30 may occupy various angular positions relative to clip 20 which permits of placing the device to which the support mechanism is fixed on a plane in various inclinations of the order of 30 to 40 degrees. This mechanism is complex and thus costly and fragile. The inclinations it provides are closer to the horizontal than to the vertical.

It is an object of the invention to provide a support mechanism which is both simple and robust.

Another object of the invention is to provide a support mechanism which permits of positioning a portable radio communication receiver on a table in a position that is close to the vertical.

SUMMARY OF THE INVENTION

For this purpose, the support mechanism described in the opening paragraph is characterized in that said transport and positioning means comprise a clip intended to be fastened by a first fixed end at the top of the back face of said receiver and a tilting member which pivots around a shaft arranged at the second elastically movable end of said clip.

The clip of conventional structure like that of the cap of a fountain pen, for example, is suitable for withstanding shocks.

An advantageous embodiment of the invention consists of the tilting member which has two end positions, one folded end position in which it is closed in by said clip in view of transport, and a completely unfolded position in which it may serve as a support member on a horizontal plane for the receiver in a position of the receiver close to the vertical.

Other relative turning positions between the clip and the tilting member permit of obtaining more inclined and more stable positions of the receiver.

Preferably, the relative positioning means of the clip and the member are formed by ridges which co-operate with recesses of complementary form, the ridges and the recesses being provided on and in side faces of the clip and of the opposite member in the proximity of the shaft.

According to a preferred embodiment of the invention, the clip is in the form of a fork having two prongs and the tilting member occupies the space situated between the prongs in its folded position in which it is closed in by the clip.

Preferably, the clip and the member are made of polyamide such as nylon or rilsan or made of polypropylene and manufactured by hot injection molding.

BRIEF DESCRIPTION OF THE DRAWINGS

These and other aspects of the invention will be apparent from and elucidated with reference to the embodiments described hereinafter.

In the drawings:

FIGS. 1A and 1B represent in A seen from the back and in B seen from the side a telecommunication receiver including a support mechanism according to the invention, FIGS. 3A and 3B show in a sketch two parts of the mechanism of FIG. 2 where positioning means are provided relating to the clip and to the supporting member.

DESCRIPTION OF PREFERRED EMBODIMENTS

Figure 2:
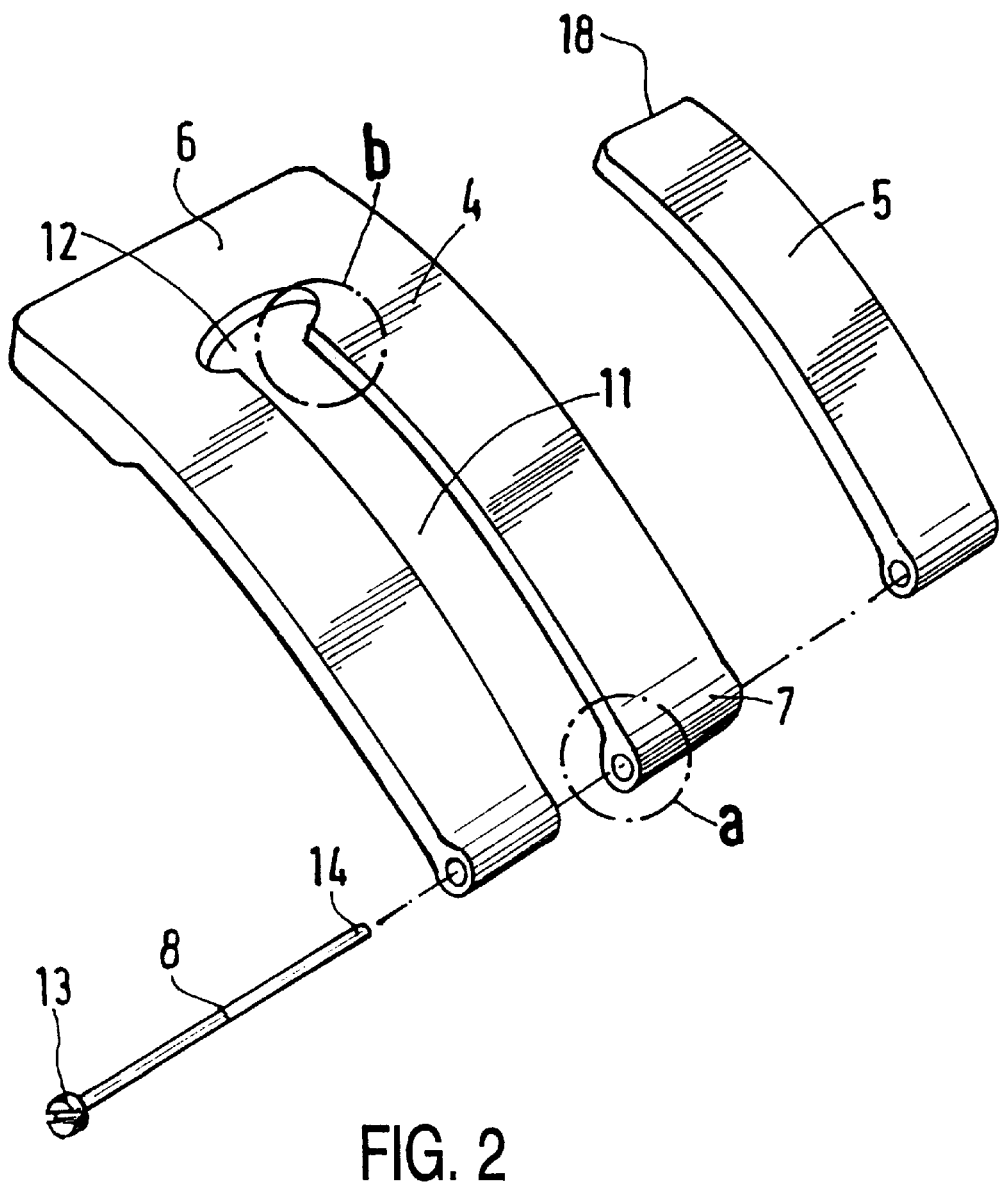
FIG. 2 represents in a perspective view the support mechanism according to the invention in an exploded view.

The radio communication receiver represented in FIGS. 1A and 1B which is a portable telephone here denoted device in the following text comprises a main body 1 with an antenna 2 for receiving (or transmitting) radio waves from (to) a transmitter which is not shown. The device also includes a support mechanism 3 which is formed by a clip 4 and a tilting member 5. The clip 4 is of a known type similar to that of a cap of a fountain pen except for the fact that its width in proportion to that of the device is larger. The clip 4 made of an elastic material is fixed by its upper end 6 to the top of the back face of the receiver. The clip may be fixed for example by means of a screw, or by a possible insertion into a casing of the body 1 provided for this purpose.

The second end 7 of the clip 4 which presses against the body 1 in a state of rest is elastically movable and comprises a shaft 8 which passes through one end of the tilting member 5. The tilting member 5 may pivot around the shaft 8 between a folded position represented in FIG. 1A wherein it coincides with the clip 4 and a completely unfolded position such as represented in dotted lines in FIG. 1B. The added lengths of the clip 4 and of the member 5 are such that the device is in upright position, FIG. 1B, on a horizontal plane 9 in a direction close to the vertical, there being provided that the device is supported by a lower stop and the second end 18 of the member 5, while these two segments form a trapezium (not shown) inside which the vertical projection of the center of gravity of the device is found. It will be noted that in this substantially vertical position the device is easy to fetch in the present state and then put it back in the same position on a table.

For that matter, it will be noted that because the battery of the device is placed in the lower part, the center of gravity of the device is advantageously situated lower than the shaft 8.

In FIG. 1B are also represented in broken lines other rotational positions of the member 5 around the shaft 8 which make it possible to obtain, for example, inclinations of 75, 52, 41°.

In the position of FIG. 1A, the receiver may be clipped in known fashion to a coat pocket or shirt pocket or also to a belt or a swimsuit.

A support mechanism for a receiver as shown in FIGS. 1A and 1B is represented in FIG. 2.

The actual clip 4 is formed by a fork having two prongs between which there is a space in the form of an interstice 11 which ends at its upper part in a bell-shaped portion 12. The tilting member in the form of a tab 5 is designed to fill the space 11 in folded position, except for the bell-shaped portion 12.

Preferably, the clip and the tilting member are made of a thermoplastic resin, of polyamide such as nylon or rilsan or polypropylene which gives them a slight elasticity and a large robustness with their thickness of the order of 2 to 3 mm. Clip and tilting member may be obtained by hot injection molding.

The shaft 8 which is coupled to the parts 4 and 5 is preferably made of metal; of steel, for example. At one end it may have a head 13. For mounting the mechanism, the shaft 8 is driven with a slight force through the free end of the first prong of the clip 4 then through one end of the tilting member 5 and through the end of the other prong of the clip 4 until the head 13 is in contact with the first prong and the other end 14 ends up on the outside of the second prong. The mounting is completed by riveting the end 14 of the shaft, which creates a slight flare of the end 14. This ensures a slight allowance between the parts 4 and 5 and thwarts the shaft 8 to leave its housing.

For obtaining the various positions of the support member represented in FIGS. 1A and 1B, there may be provided that the allowance between the parts 8 and 4, 5 on the one hand and the allowance between the parts 4 and 5 on the other is sufficiently small to maintain the device in stable manner with the inclinations that correspond to these positions, the mutual frictional forces between the elements 8, 4 and 5 being clearly higher than the weight of the device. However, to mitigate a possible reduction of the frictional forces with time and use, the embodiment of FIGS. 3A and 3B is preferred which represents enlargements of the parts referenced a and b in FIG. 2.

In FIG. 3A the side face 15 of one prong of the clip 4 has surface irregularities 16 which are either recesses or ridges respectively, regularly arranged in a circle around the hole for the shaft 8. In a manner not shown the member 5 has opposite complementary surface irregularities on its side face after being mounted, that is to say, ridges or recesses which correspond, for example, to 30 degrees of rotation from each other (12 surface irregularities around the shaft) for providing as many stable positions for the device.

This arrangement may be provided on one side of the tilting member and the prong or, preferably, on two sides.

In FIG. 3B is shown a similar arrangement to that of FIG. 3A to ensure a slight locking of the member against the clip in folded position of the member, while this locking may already have been ensured by the device shown in FIG. 3A. The side face 15 has on or in its upper part a ridge or a recess 17 intended to cooperate with a complementary recess or ridge of the member 5 situated opposite thereto, when the latter fills the space formed by the opening 11. In the latter position, the movable end of the tilting member referenced 18 in the FIGS. 1A–1B fits in the bell-shaped opening 12 while leaving a small recess. This recess is used for putting a finger or a nail in to catch the end 18 of the member 5 so as to make it pivot around the shaft 8 and place it in one of the positions represented notably in FIG. 1B.

Figure 4:
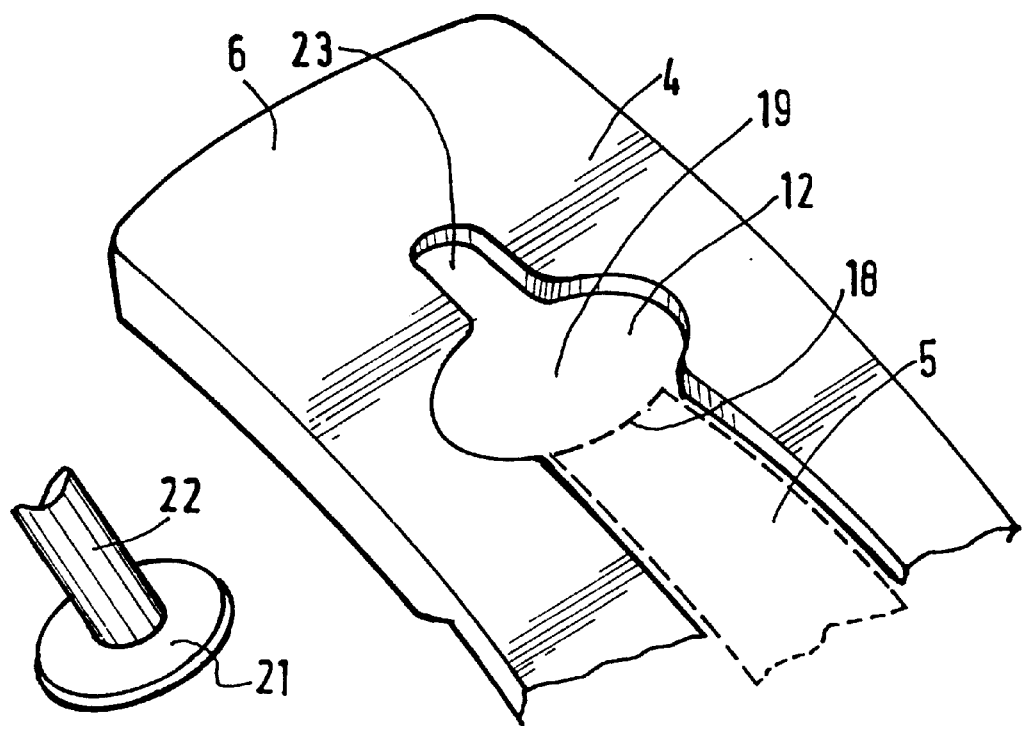
FIG. 4 represents in a perspective cut-away view an embodiment of the invention for fixing the clip to a belt.

While examining the FIGS. 2 and 3B, it may be noted that the recessed part 12 reveals a substantially circular form. This form may be benefitted from to form a button hole 19 which is represented in FIG. 4. In this Figure is shown in a broken line the end 18 of the member 5 accommodated in the opening 11 and which has a slightly concave form to fill up the circular form of the recessed part 12. A button 21 which may be fixed by any known means to a belt (not shown) is provided to be sunken into the recessed part 12 after which the support 22 of the button 21 engages with an extended recess referenced 23 at the top of the opening 11 beyond recessed part 12 so as to catch the button 21 between the clip and the body 1 of the device.

It will be noted that the recessed part 12 and the button hole 19 could be separate, the button hole then being placed highest in the clip near the end 6 at which the clip is fastened to the body 1 of the device.

Figure 5:
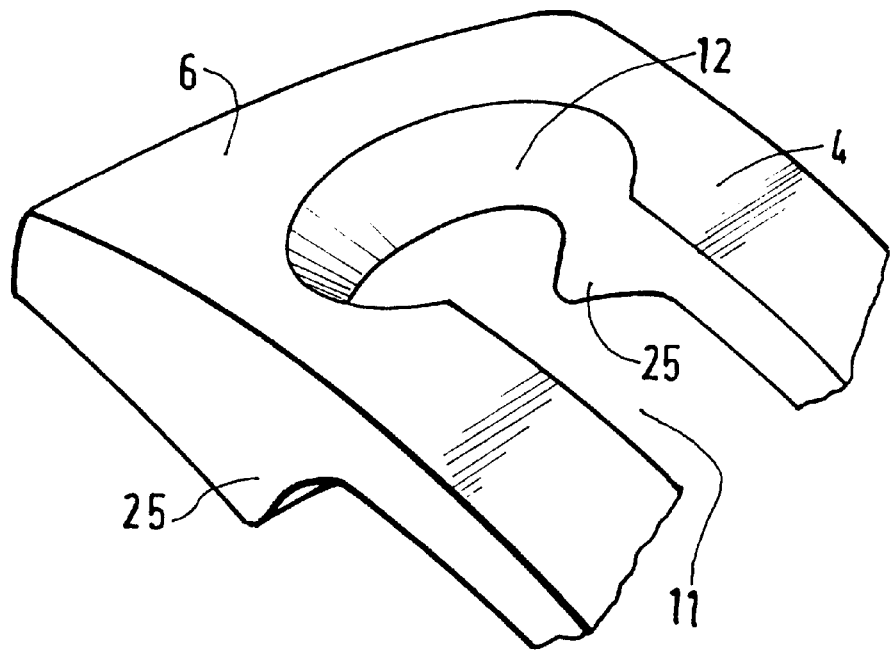
FIG. 5 represents in a perspective cut-away view an improvement of the clip according to the invention.

Openings such as 12 or 19 locally diminish the width of the prongs of the clip 4 which may render the clip more fragile and at any rate too elastic at this spot. For compensating this fragility, the prongs of the clip may locally be thickened at the spot of the functional recess(es) of the clip 4, as shown in FIG. 5 where a reinforcement 25 may be noted at the level of the flare 12 of the opening 11.

The invention is not restricted to the example described above. The clip could notably comprise only a single branch in which case the support member would be put beside it in folded position and the recessed part 12 would no longer be necessary.

What is claimed is:

1. A support mechanism for supporting a portable communication device comprising:
   a clip located at one side of said portable communication device, wherein an upper portion of said clip is fixedly attached to said one side; and
   a tilting member having a bottom end which pivots around a shaft located substantially near a lower portion of said clip, wherein a top end of said tilting member is substantially near said upper portion in a folded position and is in contact with a supporting surface in an unfolded position;
   wherein said clip has a space and, in said folded position, said tilting member fills said space except for a portion of said space located substantially near said upper portion of said clip.

2. The support mechanism of claim 1, wherein said shaft passes through holes of said lower portion of said clip and through openings of said bottom end of said tilting member.

3. The support mechanism of claim 1, wherein a side surface of said lower portion of said clip has a hole and a side part of said bottom end of said tilting member has an opening, and wherein said shaft passes through said hole and said opening.

4. The support mechanism of claim 1, wherein a side surface of said lower portion of said clip and a side part of said bottom end of said tilting member have complimentary irregularities to hold said tilting member in a desired position.

5. The support mechanism of claim 1, wherein a side surface of said lower portion of said clip and a side part of said bottom end of said tilting member have complimentary ridges and recesses to hold said tilting member in a desired position.

6. The support mechanism of claim 1, wherein said upper portion of said clip includes a button hole for co-operating with a button attached to a belt.

7. The support mechanism of claim 1, wherein said clip has reinforcements at spots having a diminished width.

8. A portable communication device having a support mechanism, said support mechanism comprising:
   a clip located at one side of said portable communication device, wherein an upper portion of said clip is fixedly attached to said one side; and
   a tilting member having a bottom end which pivots around a shaft located substantially near a lower portion of said clip, wherein a top end of said tilting member is substantially near said upper portion in a folded position and is in contact with a supporting surface in an unfolded position;
   wherein said clip has a space and, in said folded position, said tilting member fills said space except for a portion of said space located substantially near said upper portion of said clip.

9. The portable communication device of claim 8, wherein said shaft passes through holes of said lower portion of said clip and through openings of said bottom end of said tilting member.

10. The portable communication device of claim 8, wherein a side surface of said lower portion of said clip has a hole and a side part of said bottom end of said tilting member has an opening, and wherein said shaft passes through said hole and said opening.

11. The portable communication device of claim 8, wherein a side surface of said lower portion of said clip and a side part of said bottom end of said tilting member have complimentary irregularities to hold said tilting member in a desired position.

12. The portable communication device of claim 8, wherein a side surface of said lower portion of said clip and a side part of said bottom end of said tilting member have complimentary ridges and recesses to hold said tilting member in a desired position.

13. The portable communication device of claim 8, wherein said upper portion of said clip includes a button hole for co-operating with a button attached to a belt.

14. The portable communication device of claim 8, wherein said clip has reinforcements at spots having a diminished width.

* * * * *